UNITED STATES PATENT OFFICE.

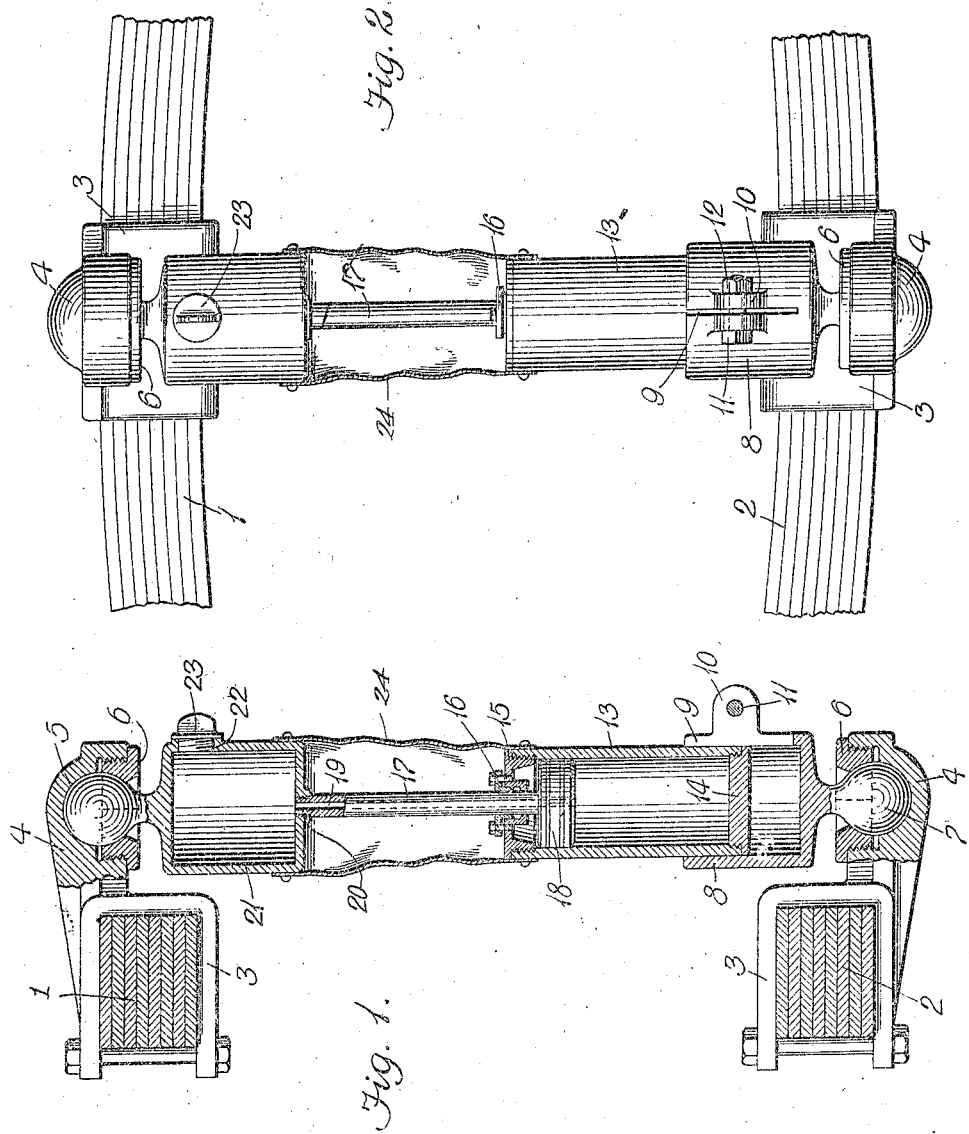

ARTHUR A. BARBER, OF DETROIT, MICHIGAN.

SHOCK-ABSORBER.

1,121,547. Specification of Letters Patent. Patented Dec. 15, 1914.

Application filed May 28, 1914. Serial No. 841,424.

*To all whom it may concern:*

Be it known that I, ARTHUR A. BARBER, a subject of the King of England, residing at Detroit, in the county of Wayne and State of Michigan, have invented certain new and useful Improvements in Shock-Absorbers, of which the following is a specification, reference being had therein to the accompanying drawings.

This invention relates to shock absorbers, and the primary object of my invention is to provide a simple, durable and inexpensive hydraulic shock absorber that can be advantageously used in connection with vehicles, as automobiles, for cushioning one part of the automobile relative to another.

A further object of my invention is to provide a shock absorbing device that can be used in connection with two movable supports or with a stationary support and one movable support, the device including connections that permit of self adjustment whereby the device can maintain itself in proper relation to its support.

The above and other objects are attained by a mechanical construction that will be hereinafter specifically described and then claimed, and reference will now be had to the drawing, wherein—

Figure 1 is a vertical sectional view of the shock absorber and Fig. 2 is a side elevation of the same partly in section.

In the drawing, 1 and 2 denote, by the way of an example, the upper and lower members of an elliptic spring commonly used for cushioning or yieldably supporting the body of a vehicle.

Secured to the upper and lower members 1 and 2 are vertically alining clamps 3 provided with brackets 4 constituting the socket members of universal joints or connections. The upper bracket 4 is carried by the top of the clamp secured to the member 1 and the lower bracket is carried by the bottom of the clamp secured to the member 2, said brackets having sockets 5 and sectional glands or retaining rings 6 for the ball members 7 of the joints or connections.

The lower ball member 7 is carried by the bottom of a cup-shaped cylinder holder 8, said holder having the wall thereof slotted or slitted, as at 9, and provided with apertured lugs 10 connected by a bolt 11 and a nut 12 or other fastening means, whereby the walls of the cylinder holder can be clamped against a cylinder 13 placed within said holder. The cylinder 13 has a detachable bottom plate or plug 14 and a detachable cap 15, said cap having a conventional form of stuffing box 16 for a tubular or hollow piston rod 17. The tubular or hollow piston rod 17 is reciprocal longitudinally of the cylinder 13 and the inner end thereof is provided with a piston head 18 having a concentric opening 19 in communication with the bore of the tubular or hollow piston rod 17. The piston head 18 has packing rings of the ordinary and well known type adapted to engage the walls of the cylinder 13.

The outer or upper end of the tubular piston rod 17 is suitably connected, as at 20 to a reservoir 21 that has the top thereof provided with the upper ball member 7 of the universal joint or connection. The reservoir 21 has a filling opening 22 normally closed by a detachable plug or cap 23, which permits of oil or a suitable fluid being placed in the reservoir to flow back and forth through the tubular piston rod 17, when the reservoir 21 moves relative to the cylinder 13 or vice versa.

The confronting ends of the cylinder 13 and the reservoir 21 are connected by a detachable apron or flexible inclosure 24, said apron preventing dirt and other matter from interfering with the reciprocal action of the piston rod 17.

It is through the medium of the universal joints or connections that the device can adjust itself to receive the thrust of either of the members 1 and 2 and cushion a movement of said members. Assuming that the member 2 is stationary and the member 1 is shifted toward the member 2 by pressure or a load upon the member 1, the fluid within the cylinder 13 must flow through the tubular piston rod 17 and the size of the bore of this piston rod determines the cushioning action of the shock absorber. The adjustment in connection with the cylinder holder permits of the device being correctly adjusted between two bodies to cushion one relatively to the other, and while in the drawing there is illustrated a preferred embodiment of my invention, it is to be understood that the structural elements are susceptible to such changes, in the size, shape and manner of assemblage, as fall within the scope of the appended claims.

What I claim is:

1. The combination with supports, of universal joints forming part thereof, a cylinder holder forming part of one of said joints, a cylinder adjustably supported by said holder, a reservoir forming part of the other of said joint and adapted to receive a fluid, a piston head reciprocal in said cylinder, and a tubular piston rod connected to said head and said reservoir and establishing communication between said cylinder and said reservoir.

2. The combination with supports, of universal joints forming part thereof, a cylinder holder forming part of one of said joints, a cylinder adjustably supported by said holder, a reservoir forming part of the other of said joint and adapted to receive a fluid, a piston head reciprocal in said cylinder, a tubular piston rod connected to said head and said reservoir and establishing communication between said cylinder and said reservoir, and an apron connecting the confronting ends of said cylinder and said reservoir and inclosing said piston rod.

3. The combination with supports, of clamps secured thereto, brackets carried by said clamps, a cylinder holder movably supported by one of said brackets, a cylinder adjustably mounted in said holder, a reservoir movably supported by the other of said brackets and adapted to receive a fluid, a piston head reciprocal in said cylinder, and a tubular piston rod connected to said piston head and said reservoir and establishing communication between said cylinder and said reservoir.

4. The combination with supports, of clamps secured thereto, brackets carried by said clamps, a cylinder holder movably supported by one of said brackets, a cylinder adjustably mounted in said holder, a reservoir movably supported by the other of said brackets and adapted to receive a fluid, a piston head reciprocal in said cylinder, a tubular piston rod connected to said piston head and said reservoir and establishing communication between said cylinder and said reservoir, and an apron connecting said cylinder and said reservoir.

In testimony whereof I affix my signature in presence of two witnesses.

ARTHUR A. BARBER.

Witnesses:
KARL H. BUTLER,
FREDERICK W. BARBER.